US011731199B2

(12) United States Patent
Herrmann et al.

(10) Patent No.: US 11,731,199 B2
(45) Date of Patent: Aug. 22, 2023

(54) METAL DROP EJECTING THREE-DIMENSIONAL (3D) OBJECT PRINTER WITH DOUBLE THERMAL LAYER INSULATION FOR THE BUILD PLATFORM TRANSLATIONAL MECHANISM

(71) Applicant: Xerox Corporation, Norwalk, CT (US)

(72) Inventors: Douglas K. Herrmann, Webster, NY (US); Varun Sambhy, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 131 days.

(21) Appl. No.: 17/339,969

(22) Filed: Jun. 5, 2021

(65) Prior Publication Data

US 2022/0388063 A1 Dec. 8, 2022

(51) Int. Cl.
*B22F 10/22* (2021.01)
*B22F 12/10* (2021.01)
(Continued)

(52) U.S. Cl.
CPC ............ *B22F 10/22* (2021.01); *B22D 23/003* (2013.01); *B22F 10/30* (2021.01); *B22F 12/10* (2021.01);
(Continued)

(58) Field of Classification Search
CPC ...... B22F 12/00; B22F 12/222; B22F 12/224; B22F 12/38; B22F 10/40; B22F 10/47; B33Y 30/00
See application file for complete search history.

(56) References Cited

U.S. PATENT DOCUMENTS

2013/0287378 A1* 10/2013 Kida ...................... H05B 3/141
392/465
2015/0076739 A1* 3/2015 Batchelder ............ B29C 48/266
264/401
(Continued)

OTHER PUBLICATIONS

He et al. ("Tribological behavior of ceramic-alloy bearing contacts in molten salt lubrication for concentrating solar power." Solar Energy Materials and Solar Cells 225 (2021): 111065.) (Year: 2021).*

*Primary Examiner* — Sally A Merkling
*Assistant Examiner* — Ricardo D Morales
(74) *Attorney, Agent, or Firm* — Maginot, Moore & Beck LLP (57) ABSTRACT

A three-dimensional (3D) metal object manufacturing apparatus has a plurality of thermally insulative members that float in a volume of heat transfer lubricating fluid in which a X-Y translation mechanism moves to position a platform opposite an ejector. The apparatus also includes a housing having an internal volume in which the platform and X-Y translation mechanism are located. The heat transfer lubricating fluid can be a molten salt, such as a molten fluoride, chloride, or nitrate molten salt. The thermally insulative members can be spheres made of zirconium oxide or zirconium dioxide. The thermally insulative layer formed by the members floating in the fluid protects the X-Y mechanism while the housing helps keep the surface temperature of the object being formed on the platform in an optimal range for bonding of melted metal drops ejected from the ejector to a surface of a metal object being formed on the platform.

20 Claims, 4 Drawing Sheets

(51) Int. Cl.
*B22F 12/90* (2021.01)
*B22F 12/00* (2021.01)
*B33Y 50/02* (2015.01)
*B33Y 10/00* (2015.01)
*B33Y 30/00* (2015.01)
*B22F 10/30* (2021.01)
*B22D 23/00* (2006.01)
*B22F 12/50* (2021.01)

(52) U.S. Cl.
CPC ............ *B22F 12/222* (2021.01); *B22F 12/50* (2021.01); *B22F 12/90* (2021.01); *B33Y 10/00* (2014.12); *B33Y 30/00* (2014.12); *B33Y 50/02* (2014.12)

(56) References Cited

U.S. PATENT DOCUMENTS

2017/0252821 A1* 9/2017 Sachs ................ B22F 10/00
2018/0141151 A1 5/2018 Liang et al.
2019/0283136 A1 9/2019 Ruppenthal et al.

* cited by examiner

METAL DROP EJECTING THREE-DIMENSIONAL (3D) OBJECT PRINTER WITH DOUBLE THERMAL LAYER INSULATION FOR THE BUILD PLATFORM TRANSLATIONAL MECHANISM

TECHNICAL FIELD

This disclosure is directed to melted metal ejectors used in three-dimensional (3D) object printers and, more particularly, to the thermal insulation of translation mechanisms for build platforms used in those systems.

BACKGROUND

Three-dimensional printing, also known as additive manufacturing, is a process of making a three-dimensional solid object from a digital model of virtually any shape. Many three-dimensional printing technologies use an additive process in which an additive manufacturing device forms successive layers of the part on top of previously deposited layers. Some of these technologies use ejectors that eject UV-curable materials, such as photopolymers or elastomers. The printer typically operates one or more extruders to form successive layers of the plastic material that form a three-dimensional printed object with a variety of shapes and structures. After each layer of the three-dimensional printed object is formed, the plastic material is UV cured and hardens to bond the layer to an underlying layer of the three-dimensional printed object. This additive manufacturing method is distinguishable from traditional object-forming techniques, which mostly rely on the removal of material from a work piece by a subtractive process, such as cutting or drilling.

Recently, some 3D object printers have been developed that eject drops of melted metal through one or more nozzles to form 3D objects. These printers have a source of solid metal, such as a roll of wire or pellets, that is fed into a chamber of an ejector head where a heater is operated to melt the solid metal. The ejector head is positioned within the opening of an electrical coil. An electrical current is passed through the coil to produce an electromagnetic field that causes the meniscus of the melted metal at a nozzle of the chamber to separate from the melted metal within the chamber and be propelled from the one or more nozzles. A platform opposite the nozzle(s) of the ejector is moved in a X-Y plane parallel to the plane of the platform by a controller operating actuators so the ejected metal drops form metal layers of an object on the platform. Another actuator is operated by the controller to alter the position of the ejector head or platform in the vertical or Z direction to position the ejector head and an uppermost layer of the metal object being formed by a distance appropriate for continuation of the object formation. This type of metal drop ejecting printer is also known as a magnetohydrodynamic printer.

One such magnetohydrodynamic printer builds parts with drops exiting the nozzle at ~400 Hz. The bulk metals melted for ejection from the nozzle of this printer include Al 6061, 356, 7075 and 4043. The size of the ejected drops is ~0.5 mm and these drops spread to a size of ~0.7 mm upon contact with the part surface. The melting temperature of these aluminum types is approximately 600° C. Empirical studies have shown that the optimal receiving surface temperature needs to be from ~400° C. to ~550° C. for good adherence to the previously formed surface. At these temperatures the melted metal drops combine with the build part in a uniform way that produces bonds that result in a strong and consistent build structure. When the build surface temperatures fall below 400° C., the drops do not combine as smoothly or with the necessary bonding strength required. This lackluster bonding increases porosity in the part, forms uneven build surfaces, produces unwelded drops, and yields shape inconsistencies. All of these unwanted results lead to degraded physical properties, such as low fatigue strength and tensile strength, as well as poor appearance issues in the final part.

As noted above, however, empirical studies have shown that if the temperature of the part is maintained at 400° C. or greater, the build quality is improved over the quality of the parts in which the temperature of the part was maintained at less than 400° C. Providing temperatures in the optimal range is possible using known heating methods such as IR heating, injecting a heated noble gas, ceramic heaters, convective heating, and the like.

Providing an enclosed environment that enables the part temperature to remain at the optimal level, however, is not a straightforward proposition. The X-Y translation mechanism used to move the build plate during the build process must be protected from the high temperatures required for building the parts. This thermal protection needs to move fluidly with the build platform moved by the X-Y translation mechanism within a confined enclosure to ensure adequate thermal insulation regardless of the position of the build platform. Additionally, the high temperatures optimal for melted metal drop bonding with previously formed layers can degrade the life of the X-Y translation mechanism. Being able to configure an environment for production of a metal part using melted metal drops that ensures optimal temperatures for metal drop bonding without adversely impacting the life of the build platform X-Y translation mechanism would be beneficial.

SUMMARY

A new 3D metal object printer provides an environment for production of a metal part using melted metal drops that ensures optimal temperatures for metal drop bonding without adversely impacting the life of the build platform X-Y translation mechanism. The 3D metal object printer includes an ejector head, a platform positioned opposite the ejector head, a heater configured to direct heat toward the platform, a translation mechanism configured to move the ejector head, a housing that encloses an internal volume in which the translation mechanism and platform are located, a first actuator operatively connected to the platform, the actuator being configured to operate the translation mechanism to move the platform within the housing, and a plurality of thermally insulative members positioned in a heat transfer lubricating fluid that covers the translation mechanism within a portion of the internal volume of the housing between the platform and the floor of the housing.

A method of operating the new 3D metal object printer provides an environment for production of a metal part using melted metal drops that ensures optimal temperatures for metal drop bonding without adversely impacting the life of the platform X-Y translation mechanism. The method includes operating a heater to direct heat toward a platform, and operating a translational mechanism within a volume of a heat transfer lubricating fluid in which a plurality of thermally insulative members are positioned between the platform and a surface of the heat transfer lubricating fluid contained within a housing to move the platform in an X-Y plane opposite an ejector head configured to eject drops of melted metal toward the platform.

BRIEF DESCRIPTION OF THE DRAWINGS

The foregoing aspects and other features of a 3D metal object printer that provides an environment for production of a metal part using melted metal drops that ensures optimal temperatures for metal drop bonding without adversely impacting the life of the build platform X-Y translation mechanism are explained in the following description, taken in connection with the accompanying drawings.

DETAILED DESCRIPTION

For a general understanding of the environment for the 3D metal object printer and its operation as disclosed herein as well as the details for the printer and its operation, reference is made to the drawings. In the drawings, like reference numerals designate like elements.

Figure 1A:
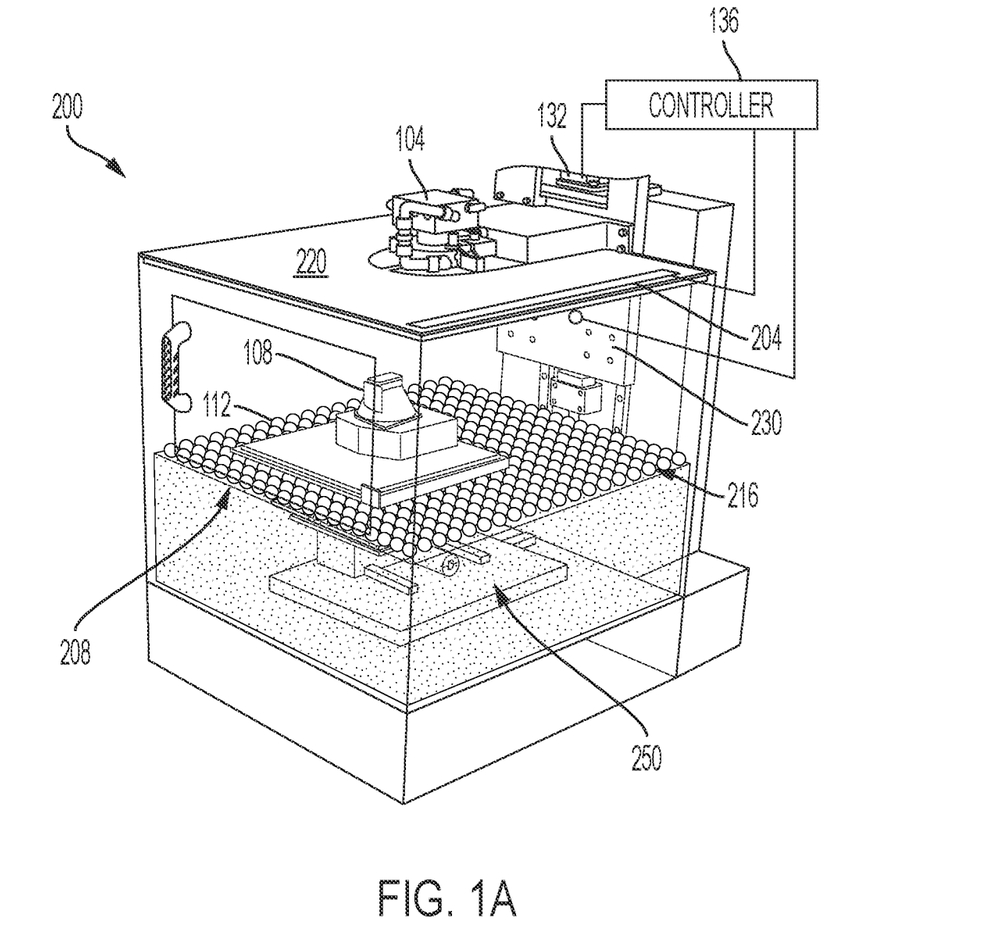
FIG. 1A is a front view of a 3D metal object printer that includes a heat transfer lubricating fluid in which a plurality of thermally insulative members are positioned to protect the X-Y translation mechanism for the build platform while enabling the part being formed to maintain a temperature in an optimal range for metal drop bonding to previously formed part layers.
Figure 1B:
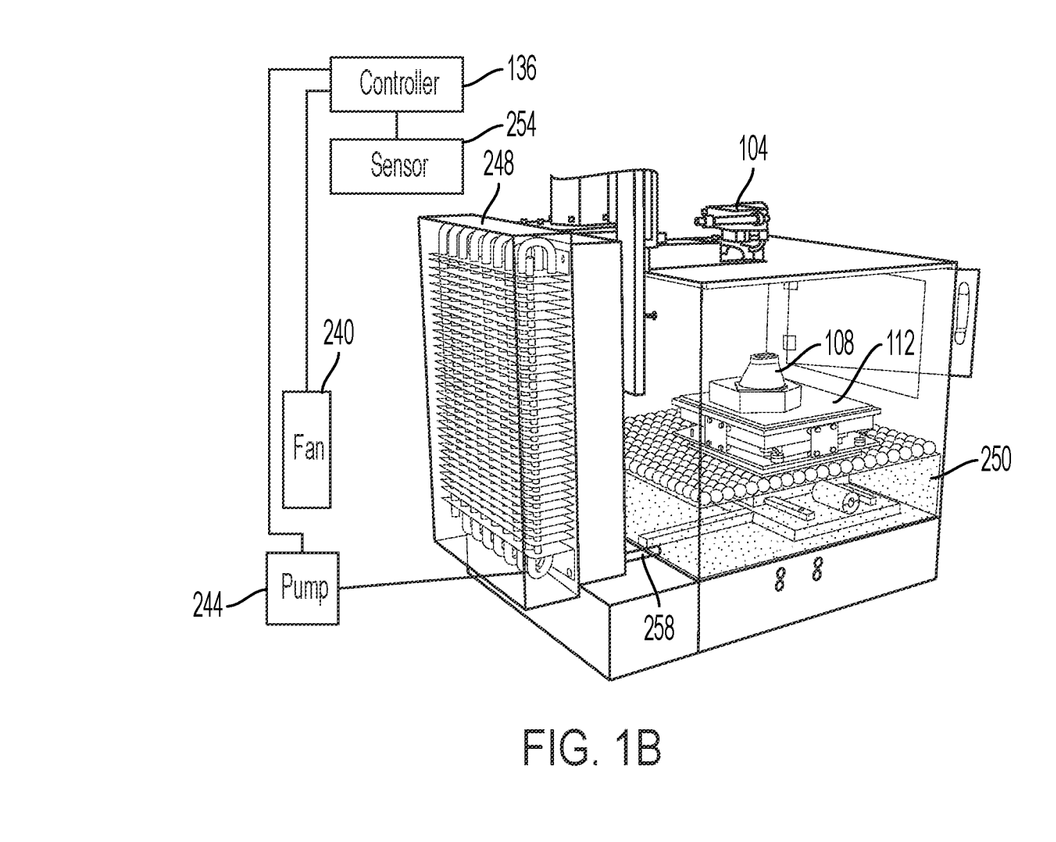
FIG. 1B is a rear view of the printer of FIG. 1A that provides a better view of the heat exchanger for the heat transfer lubricating fluid.
Figure 3:
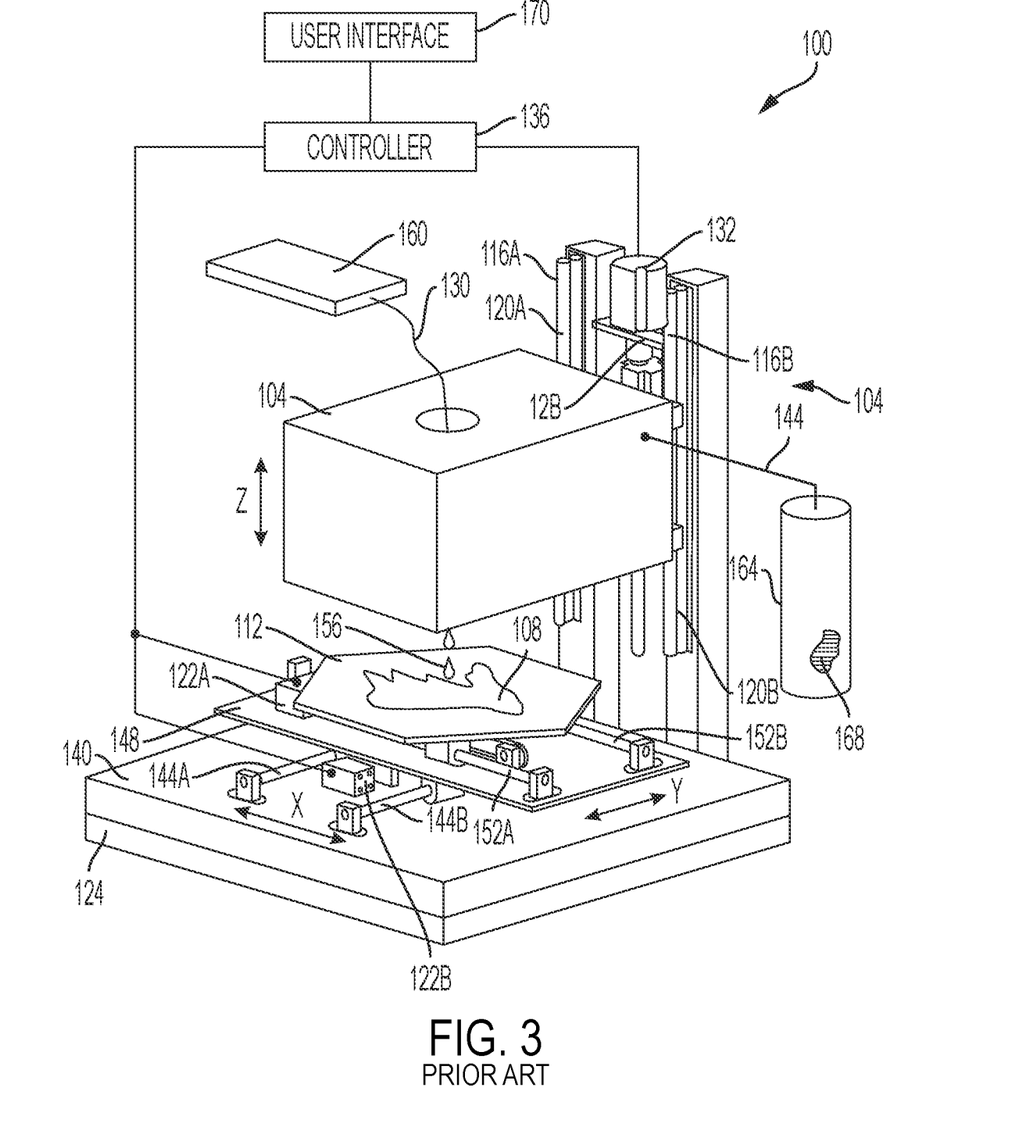
FIG. 3 depicts a previously known 3D metal object printer that cannot maintain the temperature of a part being built in an optimal range for metal drop bonding to previously formed part layers.

FIG. 3 illustrates an embodiment of a prior art melted metal 3D object printer 100 that can be modified to produce the 3D metal object printer of FIG. 1A and FIG. 1B. In this embodiment, drops of melted bulk metal are ejected from a ejector head 104 having a single nozzle, although the ejector head can be configured with a plurality of nozzles, and the ejected drops form swaths for layers of an object 108 on a platform 112. As used in this document, the term "ejector head" means the housing and components of a 3D metal object printer that melt, eject, and regulate the ejection of melted metal drops for the production of metal objects. As used in this document, the term "bulk metal" means conductive metal available in aggregate form, such as wire of a commonly available gauge or pellets of macro-sized proportions. A source of bulk metal 160, such as metal wire 130, is fed into the ejector head and melted to provide melted metal for a chamber within the ejector head. An inert gas supply 164 provides a pressure regulated source of an inert gas 168, such as argon or nitrogen, to the chamber of melted metal in the ejector head 104 through a gas supply tube 144 to prevent the formation of metal oxide in the ejector head.

The ejector head 104 is movably mounted within Z-axis tracks 116A and 116B in a pair of vertically oriented members 120A and 120B, respectively. Members 120A and 120B are connected at one end to one side of a frame 124 and at another end to one another by a horizontal member 128. An actuator 132 is mounted to the horizontal member 128 and operatively connected to the ejector head 104 to move the ejector head along the Z-axis tracks 116A and 116B. The actuator 132 is operated by a controller 136 to maintain a distance between the nozzle (not shown in FIG. 3) of the ejector head 104 and an uppermost surface of the object 108 on the platform 112.

Mounted to the frame 124 is a planar member 140, which can be formed of granite or other sturdy material to provide reliably solid support for movement of the platform 112. Platform 112 is affixed to X-axis tracks 144A and 144B so the platform 112 can move bidirectionally along an X-axis as shown in the figure. The X-axis tracks 144A and 144B are affixed to a stage 148 and stage 148 is affixed to Y-axis tracks 152A and 152B so the stage 148 can move bidirectionally along a Y-axis as shown in the figure. Actuator 122A is operatively connected to the platform 112 and actuator 122B is operatively connected to the stage 148. Controller 136 operates the actuators 122A and 122B to move the platform along the X-axis and to move the stage 148 along the Y-axis to move the platform in an X-Y plane that is opposite the ejector head 104. Performing this X-Y planar movement of platform 112 as drops of molten metal 156 are ejected toward the platform 112 forms a swath of melted metal drops on the object 108. Controller 136 also operates actuator 132 to adjust the vertical distance between the ejector head 104 and the most recently formed layer on the substrate to facilitate formation of other structures on the object. While the molten metal 3D object printer 100 is depicted in FIG. 3 as being operated in a vertical orientation, other alternative orientations can be employed. Also, while the embodiment shown in FIG. 3 has a platform that moves in an X-Y plane and the ejector head moves along the Z-axis, other arrangements are possible. For example, the ejector head 104 can be configured for movement in the X-Y plane and along the Z-axis. Additionally, for an embodiment of the ejector head 104 having a plurality of nozzles, the ejector head can configured with an array of valves (not shown) associated with the nozzles in a one-to-one correspondence to provide independent and selective control of the ejections from each of the nozzles.

The controller 136 can be implemented with one or more general or specialized programmable processors that execute programmed instructions. The instructions and data required to perform the programmed functions can be stored in a memory associated with the processors or controllers. The processors, their memories, and interface circuitry configure the controllers to perform the operations previously described as well as those described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits. During metal object formation, image data for a structure to be produced are sent to the processor or processors for controller 136 from either a scanning system or an online or work station connection for processing and generation of the ejector head control signals output to the ejector head 104.

The controller 136 of the melted metal 3D object printer 100 requires data from external sources to control the printer for metal object manufacture. In general, a three-dimensional model or other digital data model of the object to be formed is stored in a memory operatively connected to the controller 136, the controller can access through a server or the like a remote database in which the digital data model is stored, or a computer-readable medium in which the digital data model is stored can be selectively coupled to the controller 136 for access. This three-dimensional model or other digital data model can be used by the controller to generate machine-ready instructions for execution by the controller 136 in a known manner to operate the components of the printer 100 and form the metal object corresponding to the model. The generation of the machine-ready instructions can include the production of intermediate models, such as when a CAD model of the device is converted into an STL data model, or other polygonal mesh or other intermediate representation, which can in turn be processed to generate machine instructions, such as g-code, for fabrication of the device by the printer. As used in this document, the term "machine-ready instructions" means computer language commands that are executed by a computer, microprocessor, or controller to operate components of a 3D metal object additive manufacturing system to form metal objects on the platform 112. The controller 136 executes the machine-ready instructions to control the ejection of the melted metal drops from the ejector head 104, the positioning of stage 148 and the platform 112, as well as the distance between the ejector head 102 and the uppermost layer of the object 108 on the platform 112.

FIG. 1A and FIG. 1B illustrate an embodiment of a melted metal 3D object printer 100 that provides an environment for production of a metal part using melted metal drops that ensures optimal temperatures for metal drop bonding without adversely impacting the life of the build platform X-Y translation mechanism. In the description of this printer, like reference numbers for components discussed above with reference to FIG. 3 are used for like components in the printer of FIG. 1A and FIG. 1B. The printer 200 includes an ejector head 104 that is mounted on a support plate 204. The ejector head 104 and the support plate 204 are configured to move vertically bidirectionally along the Z axis by operation of the actuator 132. The support plate moves within an internal volume of a housing 208 formed by four standing walls to form a rectangularly shaped housing. The housing 208 in FIG. 1A and FIG. 1B is made of a transparent material to facilitate viewing of the internal volume of the housing, although the housing can be made of translucent or opaque materials and can have shapes other than the rectangular shape shown in the figure. The wall or walls forming the housing enclose the internal volume except for the upper opening in which the support plate 204 fits. The clearance between the edges of the support plate 204 and the walls of the housing 208 are relatively tight to help hold heat within the housing. The wall or walls of the housing 208 are made of a heat resistant material, such as quartz glass. One or more heating elements 220 are mounted to the side of support plate 204 that faces the internal volume of the housing 208. These heating elements can be infrared heaters, outlets for noble gases heated outside of the housing, ceramic heaters, convective heaters, and the like. In one embodiment, the gas atmosphere surrounding the part 108 on the platform 112 is an inert gas environment, such as nitrogen or argon. The inert gas supplied to the atmosphere surrounding the part 108 is likely the same gas as being supplied to the ejector head 104. In an embodiment, eight millimeter heating tubes made by Heraeus Noblelight of Gaithersburg, Md. form the heating elements mounted to the support plate 204. Also, a temperature sensor 230 is operatively connected to the controller 136 to provide the controller with a signal indicative of the temperature within the volume of the housing 208. The controller 136 is configured to compare the signal from the sensor 230 to an upper temperature limit and lower temperature limit for the internal volume of the housing that maintains the object surface temperature in the range of about 400° C. to about 550° C. The housing helps maintain the temperature of the object 108 within the optimal range of about 400° C. to about 550° C. because it encloses the space around the object and helps prevent the loss of heat from the internal volume of the housing 208. The dimensions of the internal volume of the housing 208 can be optimized to help balance the parameters affecting temperatures within the internal volume of the housing.

With continued reference to FIG. 1A and FIG. 3, platform 112 on which the object 108 is formed is supported by the planar member 140 and the X-Y translation mechanism as described above with reference to FIG. 3. As noted above with respect to FIG. 3, controller 136 operates the actuators 122A and 122B to move the platform along the X-axis and to move the stage 148 along the Y-axis to move the platform in an X-Y plane that is opposite the ejector head 104. Performing this X-Y planar movement of platform 112 as drops of molten metal 156 are ejected toward the platform 112 forms a swath of melted metal drops on the object 108. This X-Y translation mechanism, although visible, is covered in a volume of heat transfer lubricating fluid 250. As used in this document, the term "heat transfer lubricating fluid" means a material in the liquid phase that reduces the coefficient of friction between the thermally insulative members when they engage one another. This heat transfer lubricating fluid 250 provides lubrication for the movement of the components of the X-Y translation mechanism and the displacement of the thermally insulative members without impeding the movement of platform 112. As the platform slides along the members of the X-Y mechanism, the fluid and the members are displaced by the mechanism components.

Positioned within the heat transfer lubricating fluid 250 is a plurality of thermally insulative spheres 216 that float on the surface of the fluid 250 so they are interposed between the surface of the fluid and the bottom of the platform 112. These thermally insulative spheres and the heat transfer lubricating fluid combine to provide a flexible and fluid thermal insulation layer that moves and conforms to the movement of platform 112 while providing full thermal insulation for the X-Y mechanism. The thermally insulative members insulate the lubricating fluid from the high temperature of the build platform. The members reduce the heat transfer to the fluid by providing a lower thermal conductivity layer that floats on the fluid. This layer reflects the radiant heat back into the housing volume above the layer, which insulates and protects the fluid. The combination of the members floating on the fluid allows for less energy to be absorbed by the fluid and opens up options for additional insulating fluids. As the platform slides along the members of the X-Y mechanism, the ceramic spheres 216 move within the fluid 250. Although the embodiment of FIG. 1A and FIG. 1B depicts spherical balls of the insulative material, other shapes are possible provided they facilitate frictionless movement of the thermally insulative members with respect to one another and with the components of the X-Y translation mechanism.

The heat transfer lubricating fluid 250 in one embodiment is a high temperature rated molten salt fluid that is non-toxic and non-corrosive. As used in this document, the term "molten salt" means a fluoride, chloride, or nitrate salt at a temperature that is greater than the melting temperature of the salt, The fluid allows the platform to move easily while providing full non-corrosive and temperature-controlled coverage for the X-Y translation mechanism. The molten salt fluid used in one embodiment is Dynalene MS-1, which is available from Dynalene of Whitehall, Pa. This molten salt solution has a maximum operating temperature of 565° C., although this molten salt should not be kept at the maximum temperature for a long period of time as precipitates form. The molten salt becomes a liquid above 225° C. so it needs to be heated to that temperature and maintained at that temperature or higher so the material remains molten in the housing 208. The melting operation is performed in a heated reservoir that is remote from the system 200 so the molten salt can be cooled during maintenance or other system 200 down times. When the molten salt is permitted to solidify, it expands so the reservoir that is heated to return the salt to its molten state must have a capacity that is greater than the volume of molten salt needed to cover the translation mechanism. The molten salt can be used with carbon steel components up to a temperature of about 400° C. Above 400° C., the components within the housing 208 are made of stainless steel, Inconel, or other corrosion-resistant alloys. Since the maximum operating temperature for this molten salt is a little short of 565° C., it is well-suited for maintaining the metal part 108 in the temperature range of about 400° C. to about 550° C. provided the components of the translation mechanism are made of the appropriate corrosion-resistant materials.

The size of the individual spheres floating in the heat transfer lubricating fluid can be optimized for different embodiments of the printer 200. In one embodiment, spheres having a diameter of about 5 mm are used, although the diameter of the spheres can be in a range of about 1/16 of an inch to about 1/2 of an inch or in a range of about 2 mm to about 6 mm. Known industrial thermally insulative materials are rated to temperatures of 1100° C. and higher. Thus, the thermally insulative members 216 enhance the thermal insulative benefits of the heat transfer lubricating fluid and help keep the fluid within its operational range noted above. The material forming the thermally insulative members should be hard, chemically non-reactive, non-porous, and have a thermal conductivity in a range of about 1.8 W/m·K to about 2.2 W/m·K or higher. Ceramic spheres made of zirconium dioxide or zirconium oxide and having a diameter of 5 mm are an example of such members and are available from BC Precision in Chattanooga, Tenn. Ceramic members are non-porous so their surfaces are essentially frictionless. The housing also helps maintain the temperature of the object 108 within the optimal range of about 400° C. to about 550° C. because it encloses the space around the object and helps prevent the loss of heat from the internal volume of the housing 208. The dimensions of the internal volume of the housing 208 can be optimized to help balance the parameters affecting temperatures within the internal volume of the housing.

FIG. 1B shows the printer 200 in a rear view. In this view, a heat exchanger 248 is fluidly connected to the volume of heat transfer lubricating fluid 250 by a pipe 258. A pump 244 is fluidly connected to the heat exchanger 248 and the pipe 258 to pull fluid 250 from the housing 208 and recirculate it through the heat exchanger to remove heat from the fluid before returning the fluid to the housing 208 through another pipe 258. Ambient air in the heat exchanger removes the heat from the fluid passing through the exchanger. Additionally, a fan 240 can be configured to blow air through the heat exchanger 248 to aid in the cooling of the fluid 250. Both the fan 240 and the pump 244 are connected to the controller 136 so the controller can operate the components to move the fluid 250 through the heat exchanger or blow air through the exchanger. A temperature sensor 254 is also operatively connected to the controller 136 to provide a signal generated by the sensor that is indicative of the temperature of the fluid in the heat exchanger. The controller 136 is configured with programmed instructions, which when executed, compare the signal from the sensor 254 to a maximum temperature, which in one embodiment is 500° C., and when the temperature of the fluid 250 in the exchanger 248 exceeds that maximum temperature, the controller 136 operates the fan 244 to aid in the cooling of the fluid by the heat exchanger 248.

Figure 2:
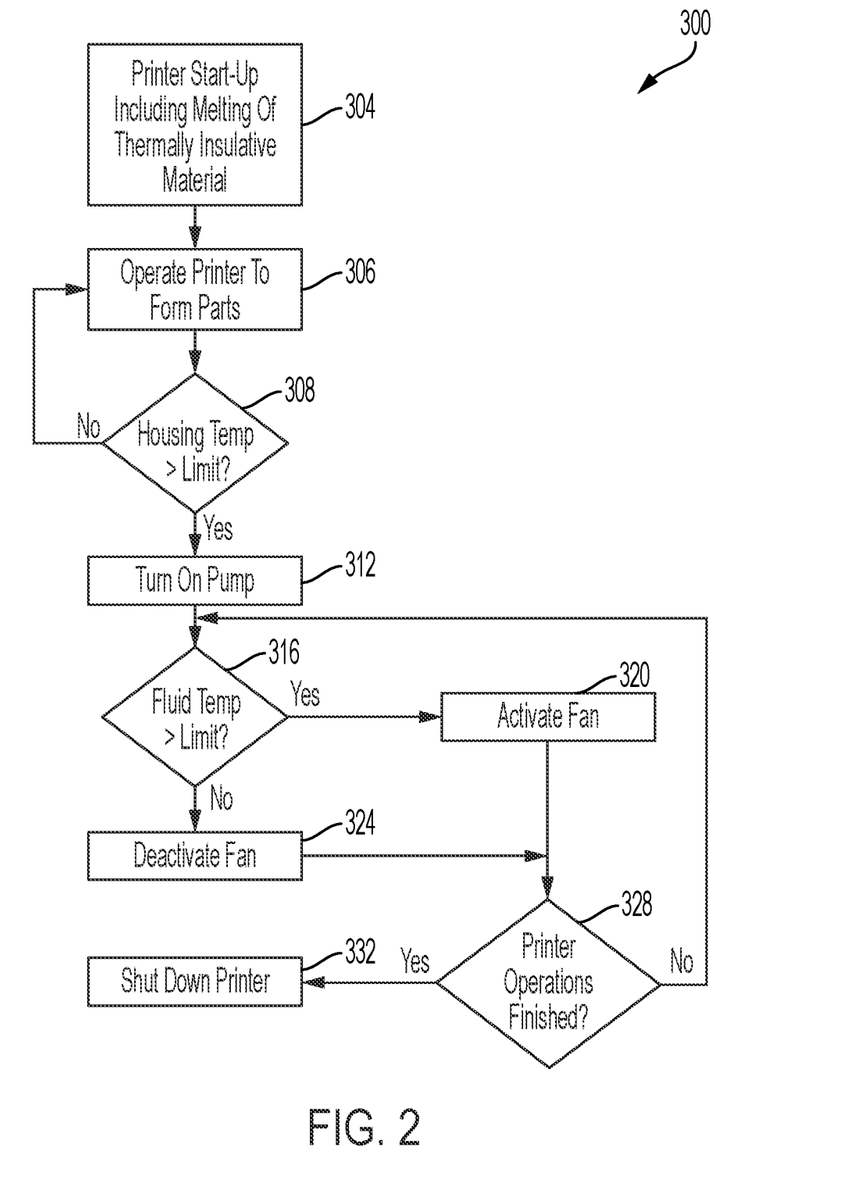
FIG. 2 is a flow diagram of a process for operating the printer of FIG. 1A and FIG. 1B.

A process for operating the printer shown in FIG. 1A and FIG. 1B is shown in FIG. 2. In the description of the process, statements that the process is performing some task or function refers to a controller or general purpose processor executing programmed instructions stored in non-transitory computer readable storage media operatively connected to the controller or processor to manipulate data or to operate one or more components in the printer to perform the task or function. The controller 136 noted above can be such a controller or processor. Alternatively, the controller can be implemented with more than one processor and associated circuitry and components, each of which is configured to form one or more tasks or functions described herein. Additionally, the steps of the method may be performed in any feasible chronological order, regardless of the order shown in the figures or the order in which the processing is described.

FIG. 2 is a flow diagram 300 of a process that operates the printer 200. The process begins with the printer start-up, which includes melting a heat transfer material in a remote reservoir and supplying the molten salt or other heat transfer lubricating fluid to the interior volume of housing 208 (block 304). The thermally insulative members 216 were placed on the floor of the housing before the addition of the lubricating fluid. Since the members float, they are raised by the rising fluid level so they are interposed between the top surface of the fluid and the platform. Printer operations begin (block 306). When the temperature in the housing exceeds a predetermined maximum temperature (block 308), the pump is turned on to move fluid through the heat exchanger (block 312). The predetermined maximum temperature is less than the temperature than the ejected melted drops but greater than the temperature to which the platform 112 is heated. In one embodiment, the ejected metal drops are ejected at a temperature of about 600° C. to about 650° C., while the platform 112 is maintained at a temperature of about 400° C. In this embodiment, the predetermined maximum temperature for the atmosphere surrounding the part is about 550° C. The temperature of the fluid being returned to the housing from the heat exchanger is monitored until it exceeds a maximum return temperature for the fluid (block 316). In the embodiment discussed above that heats the platform 112 to about 400° C. and that uses Dynalene MS-1, this maximum return temperature is about 500° C. Once that temperature is reached, the fan is activated (block 320). If the temperature of the returning fluid falls below predetermined lower temperature for the fluid, the fan is deactivated (block 324). In the embodiment being discussed in which the optimal temperature range for material bonding within the housing is about 400° C. to about 550° C., this predetermined lower temperature is about 450° C. This process of heat transfer lubricating fluid temperature regulation continues until the printer operations are halted (block 328). The fluid is transferred from the housing to the remote reservoir and the heaters for the housing are deactivated (block 332). The thermally insulative members 216 come to rest on the floor of the housing when the fluid is drained from the housing for transfer to the remote reservoir.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A metal drop ejecting apparatus comprising:
an ejector head;
a platform positioned opposite the ejector head;
a heater configured to direct heat toward the platform;
a translation mechanism configured to move the platform in an X-Y plane opposite the ejector head;
a housing that encloses an internal volume in which the translation mechanism and platform are located;
a first actuator operatively connected to the platform, the first actuator being configured to operate the translation mechanism to move the platform within the housing; and
a plurality of thermally insulative members positioned in a volume of heat transfer lubricating fluid that comprises a molten salt and covers the translation mechanism within a portion of the internal volume of the housing between the platform and the floor of the housing, each thermally insulative member has a spherical shape.

2. The apparatus of claim 1 wherein the ejector head is configured for fluid connection to a source of melted bulk metal.

3. The apparatus of claim 2 wherein the translation mechanism is a X-Y translation mechanism configured to move the ejector head in an X-Y plane parallel to the platform.

4. The apparatus of claim 3 wherein the housing has at least one wall and a floor that encloses an internal volume in which the X-Y translation mechanism and the platform are located.

5. The apparatus of claim 4 further comprising:
a second actuator operatively connected to the ejector head, the second actuator being configured to move the ejector head bidirectionally along an axis perpendicular to the X-Y plane within the internal volume of the housing.

6. The apparatus of claim 5 further comprising:
a controller operatively connected to the heater, the first actuator, the second actuator, and the ejector head, the controller being configured to:
operate the first actuator to operate the X-Y mechanism to move the ejector head in the X-Y plane within the internal volume of the housing;
operate the heater to direct heat toward the platform; and
operate the ejector head to eject drops of melted bulk metal to form a metal object on the platform.

7. The apparatus of claim 6 further comprising:
a heat exchanger fluidly connected to the volume of heat transfer lubricating fluid in the housing;
a pump operatively connected between the heat exchanger and the volume of heat transfer lubricating fluid in the housing;
a first temperature sensor configured to generate a signal indicative of a temperature within the internal volume of the housing; and
the controller being operatively connected to the first temperature sensor and the pump, the controller being further configured to compare the signal generated by the first temperature sensor to a maximum operating temperature for the heat transfer lubricating fluid; and
operate the pump to move heat transfer lubricating fluid from the housing into the heat exchanger and back into the housing when the signal generated by the first temperature sensor exceeds the maximum operating temperature for the heat transfer lubricating fluid.

8. The apparatus of claim 7, the controller being further configured to compare the signal generated by the first temperature sensor to an upper temperature limit and a lower temperature limit to operate the heater and maintain the upper surface of the object being formed in the temperature range of about 400° C. to about 550° C.

9. The apparatus of claim 8 further comprising:
a fan configured to direct air toward the heat exchanger; and
a second temperature sensor configured to generate a signal indicative of a temperature of the heat transfer lubricating fluid being returned to the housing from the heat exchanger; and
the controller is operatively connected to the second temperature sensor and the fan, the controller being further configured to:
compare the signal generated by the second temperature sensor to an maximum return temperature for the heat transfer lubricating fluid; and
operate the fan to direct air into the heat exchanger when the signal generated by the second temperature sensor exceeds the maximum return temperature for the heat transfer lubricating fluid.

10. The apparatus of claim 9 wherein the heater comprises an infrared heating tube.

11. The apparatus of claim 9 wherein the heater comprises a convective or ceramic heater.

12. The apparatus of claim 1 wherein the molten salt comprises a fluoride, chloride, or nitrate salt.

13. The apparatus of claim 1 wherein each thermally insulative member has a thermal conductivity in a range of about 1.8 W/m·K to about 2.2 W/m·K.

14. The apparatus of claim 13 wherein each thermally insulative member has a diameter of about 1/16 of an inch to about 1/2 of an inch or about 2 mm to about 6 mm.

15. The apparatus of claim 14 wherein each thermally insulative member is formed of a material including a ceramic that includes zirconium dioxide or zirconium oxide.

16. A metal drop ejecting apparatus comprising:
an ejector head;
a platform positioned opposite the ejector head;
a heater configured to direct heat toward the platform;
a translation mechanism configured to move the platform in an X-Y plane opposite the ejector head;
a housing that encloses an internal volume in which the translation mechanism and platform are located;
a first actuator operatively connected to the platform, the first actuator being configured to operate the translation mechanism to move the platform within the housing; and
a plurality of thermally insulative members positioned in a volume of heat transfer lubricating fluid that covers the translation mechanism within a portion of the internal volume of the housing between the platform and the floor of the housing, the plurality of thermally insulative members float on the heat transfer lubricating fluid to form an insulative layer over the heat transfer lubricating fluid.

17. The apparatus of claim 16 further comprising:
a heat exchanger fluidly connected to the volume of heat transfer lubricating fluid in the housing;
a pump operatively connected between the heat exchanger and the volume of heat transfer lubricating fluid in the housing;
a first temperature sensor configured to generate a signal indicative of a temperature within the internal volume of the housing; and
a controller operatively connected to the first temperature sensor and the pump, the controller being configured to compare the signal generated by the first temperature sensor to a maximum operating temperature for the heat transfer lubricating fluid; and
operate the pump to move heat transfer lubricating fluid from the housing into the heat exchanger and back into the housing when the signal generated by the first temperature sensor exceeds the maximum operating temperature for the heat transfer lubricating fluid.

18. The apparatus of claim 17, the controller being further configured to compare the signal generated by the first temperature sensor to an upper temperature limit and a lower temperature limit to operate the heater and maintain the upper surface of the object being formed in the temperature range of about 400° C. to about 550° C.

19. The apparatus of claim 18 further comprising:
a fan configured to direct air toward the heat exchanger; and
a second temperature sensor configured to generate a signal indicative of a temperature of the heat transfer lubricating fluid being returned to the housing from the heat exchanger; and
the controller is operatively connected to the second temperature sensor and the fan, the controller being further configured to:
compare the signal generated by the second temperature sensor to an maximum return temperature for the heat transfer lubricating fluid; and
operate the fan to direct air into the heat exchanger when the signal generated by the second temperature sensor exceeds the maximum return temperature for the heat transfer lubricating fluid.

20. The apparatus of claim 16 wherein the heat transfer lubricating fluid comprises a molten salt.

\* \* \* \* \*